United States Patent [19]

Secrest

[11] Patent Number: 5,541,846
[45] Date of Patent: Jul. 30, 1996

[54] SELF-IMPROVING WORK INSTRUCTION SYSTEM

[76] Inventor: Edgar A. Secrest, 18277 Bishop La., Strongsville, Ohio 44136

[21] Appl. No.: 327,694

[22] Filed: Oct. 24, 1994

[51] Int. Cl.⁶ .................................................... G06F 17/60
[52] U.S. Cl. ...................... 364/468.17; 364/552; 364/179
[58] Field of Search ....................... 364/468, 551.01–552, 364/184, 178, 179, 180, 182, 188, 401, 402, 554; 73/863, 683.01; 395/904, 911, 912

[56] References Cited

U.S. PATENT DOCUMENTS

| | | | |
|---|---|---|---|
| 3,147,370 | 9/1964 | Lowman | 364/552 |
| 3,824,387 | 7/1974 | Garst | 364/179 |
| 3,946,212 | 3/1976 | Nakao et al. | 364/552 |
| 4,320,463 | 3/1982 | Himmelstein | 364/552 |
| 4,644,480 | 2/1987 | Haruna et al. | 364/552 |
| 4,660,152 | 4/1987 | Downing et al. | 364/552 |
| 4,709,337 | 11/1987 | Knapp et al. | 364/468 |
| 4,847,792 | 7/1989 | Barna et al. | 364/552 |
| 4,961,148 | 10/1990 | Holda et al. | 364/468 |
| 5,028,923 | 7/1991 | Seki et al. | |
| 5,077,674 | 12/1991 | Tischler et al. | 364/468 |
| 5,134,574 | 7/1992 | Beaverstock et al. | 364/551.01 |
| 5,166,874 | 11/1992 | Nomaru et al. | 364/184 |
| 5,208,765 | 5/1993 | Turnbull | 364/552 |
| 5,241,482 | 8/1993 | Iida et al. | 364/468 |
| 5,353,238 | 10/1994 | Neef et al. | 364/552 |

Primary Examiner—Roy N. Envall, Jr.
Assistant Examiner—Steven R. Garland
Attorney, Agent, or Firm—Fay, Sharpe, Beall, Fagan, Minnich & McKee

[57] ABSTRACT

Information to set up various audit procedures is input through an operator terminal (10) to an audit revision processor (120). The audit revision processor creates various audit points by creating an audit point identification and the various audit parameters including identification of an item on which the audit is performed, the nature of the defects sought by the audit, any test fixtures used in the audit, standards, dimensions, or tolerances against which the item is tested, and the like. Once a series of audit points are created, the operator uses a video monitor (12) and a mouse (14) in a point and shoot manner to identify a selected audit from an audit look-up table (40) which retrieves a corresponding audit point identification. The audit point identification is supplied to memories (42, 50, 60) which provide corresponding information for display on the monitor (12) and which provides an initial address information to a sampling matrix (80). The audit identification selects a range of percentages of designated items to be audited plus an initial percentage. The initial percentage point determines a sample rate for a test fixture (86). Defects are input manually (116) or automatically and stored in a history memory (90). A defect analysis routine (94) analyzes the feedback defect information. Based on this comparison, the defect analysis circuit addresses the sampling matrix (80) to increment and decrement the sampled percentage within the selected range.

19 Claims, 5 Drawing Sheets

FIG. 2

In Process     QWI#: 1019788     Rev: B

Description: 24" CUSTOM WAGON WHEEL     Item Rev: N
Date Printed: 10/7/94     Valid Thru: 11/6/94

Auditor Instructions

| Audit Point Description | Def Code | Prev. % Rej | Sampling Level | Pcs/ Rate |
|---|---|---|---|---|
| *1111 \ MOLD FLOOR OPERATION \ Visual Requirements* | | | | |
| 1) CHECK FOR WHITE SPOTS ON HUB AND GATE AREA | V02 | 0.00% | 15.00% | 3 /hr. |
| 2) CHECK FOR SHORTS BY HUB AREA | V03 | 20.00% | 15.00% | 3 /hr. |
| 3) CHECK FOR HIGH GATES LEFT ON PART | V05 | 1.79% | 15.00% | 3 /hr. |
| 4) WATCH FOR FLOW LINES AT HUB AREA SOME ARE OK, CAN'T SHORT OR CLEVICE | V07 | 0.22% | 100.00% | 20 /hr. |
| 5) CHECK FOR PULLED HOLE ON SPOKES 9X | V08 | 0.54% | 100.00% | 20 /hr. |
| 6) VERIFY 2-7/16" BEARINGS & 5/8" SPACER AND PROPER ARBOR IS CORRECT | V09 | 0.23% | 100.00% | 20 /hr. |
| 7) VERIFY NO PIN MARKS ARE CAUSING WHITE OR PUSH THROUGH | V10 | 0.00% | 100.00% | 20 /hr. |
| 8) CHECK FOR PROPER DATE CODE AND SHIFT. MUST BE CHANGED EVERY SHIFT | V12 | 1.31% | 15.00% | 3 /Sft |
| *1111 \ MOLD FLOOR OPERATION \ Dimensional Requirements* | | | | |
| 1) CHECK WARPAGE TO VERIFY THE RIM IS <.150" ON THE EDGE | M06 | 0.00% | 15.00% | 3 /hr. |
| * USE FIXTURE # 178955-1 -> WARPAGE CK FIXTURE FOR WHEEL | | | | |
| * CALIBRATION DUE: 12/31/99 | | | | |
| 2) CHECK .080 TIR MAX WITH INDICATOR @ .075+ TAG AND NOTIFY SUPERVISOR | M07 | 4.18% | 15.00% | 3 /ctn |
| *1111 \ MOLD FLOOR OPERATION \ Testing Requirements* | | | | |
| 1) 1000# COMP. TEST AT 3 GATES, RECORD READINGS. MEAN = AVG. OF ALL TESTS | M01 | 58.28% | 100.00% | 20 /ctn |
| *1111 \ MOLD FLOOR OPERATION \ Packaging Requirements* | | | | |
| 1) LABEL MUST SHOW ALL INFO, LOT#, ETC | P01 | 0.00% | 0.10% | 0.02 /ctn |

All non-conforming product should be handled per QAP - 4.1 (Non-Conforming Material Review)

FIG. 3

SELF-IMPROVING WORK INSTRUCTION SYSTEM

BACKGROUND OF THE INVENTION

The present invention relates to performance review systems for assuring compliance with performance standards. It finds particular application in conjunction with quality auditing of manufacturing processes and will be described with particular reference thereto. However, it is to be appreciated that the present invention will also find application in conjunction with customer surveys, supplier surveys, and the like.

There is currently an effort to standardize the morass of quality, assurance standards. An international quality standard known as ISO-9000 has been developed. The ISO-9000 standards provide a detailed, yet standardized, set of instructions which enable customers around the world to be assured of the quality of a product.

The computer has been utilized in preparing quality information documents and electronically transmitting them to an appropriate user location. See, for example, U.S. Pat. No. 4,961,148 of Holda, et al. Such computer systems received various quality and testing instructions, and forwarded the instructions and standards to appropriate work stations. Although such a computer system disseminated the documentation to the appropriate workstations, it provided no assurance that the instructions or standards were being followed. Moreover, the standards were subject to interpretation by employees. Different employees at various workstations could interpret the same standard differently. Even workers working different shifts on the same fixture or equipment could interpret the standards differently. If there were customer returns fox defective parts or products, the computer system provided no basis for identifying the cause of the defects. Rather, human-labor was commonly required to analyze the defective parts, try to trace the defect to one or more portions of the manufacturing process, and revise the quality standards and instructions as a result of such analysis.

The present invention provides a new and improved system which overcomes the above-referenced problems and others.

SUMMARY OF THE INVENTION

In accordance with the present invention, a self-correcting work inventory instruction system is provided, A sampling matrix memory stores a range of sampling percentages for each of a plurality of operator selectable audits, The sampling matrix is responsive to operator selected audit information to select a corresponding sampling range and an initial output sampling percentage from within in the sampling range. The sampling matrix memory is further addressable to increment and decrement the output sampling percentage. A defect feedback means provides test result and defect information. A defect analysis means compares the test result and defect information with preselected criteria for the selected audit. The defect analysis means is connected with the sampling matrix memory for incrementing and decrementing the output sampling percentage within the sampling range in accordance with deviations between the test result and defect information and the preselected audit characteristics.

In accordance with a more limited aspect of the present inventions, a history memory is connected with the defect feedback means for storing the test result and defect information in association with an identification of the selected audit.

In accordance with another aspect of the present invention, the defect information feedback means includes an automated test fixture.

In accordance with another aspect of the present invention, the defect information feedback means includes an operator display screen for providing test instructions and information and a manual input terminal for receiving operator input information regarding test results, warranty claims, customer survey information, and the like.

In accordance with another aspect of the present invention, the operator input terminal includes a video display, a computer which provides picture information to the video display, and a mouse. The computer provides an image on the video display which includes blanks for receiving the item and defect identifications, blanks for displaying audit title and other audit characteristics, and icons. The computer providing a mouse controlled cursor for clicking the icons with a point and shoot selection procedure for selecting among the plurality of audits and providing corresponding information in the designated display areas.

One advantage of the present invention is that it improves standardization and standardizes interpretations.

Another advantage of the present invention is that it provides for automatic correction and adjustment without human intervention in the monitored manufacturing and quality review process.

Another advantage of the present invention is that it maintains detailed defect records and enables the source of defects to be traced accurately.

Another advantage of the present invention resides in its flexibility. Custom standards are readily entered and existing standards modified as is appropriate to the manufacturing process with which it is used.

Another advantage of the present invention resides in its user-friendly ease of operation.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 2 illustrates an input display panel in accordance with the present invention;

FIG. 3 is an exemplary quality work information audit instruction set; and,

DETAILED DESCRIPTION OF THE PREFERRED EMBODIMENTS

Figure 1:
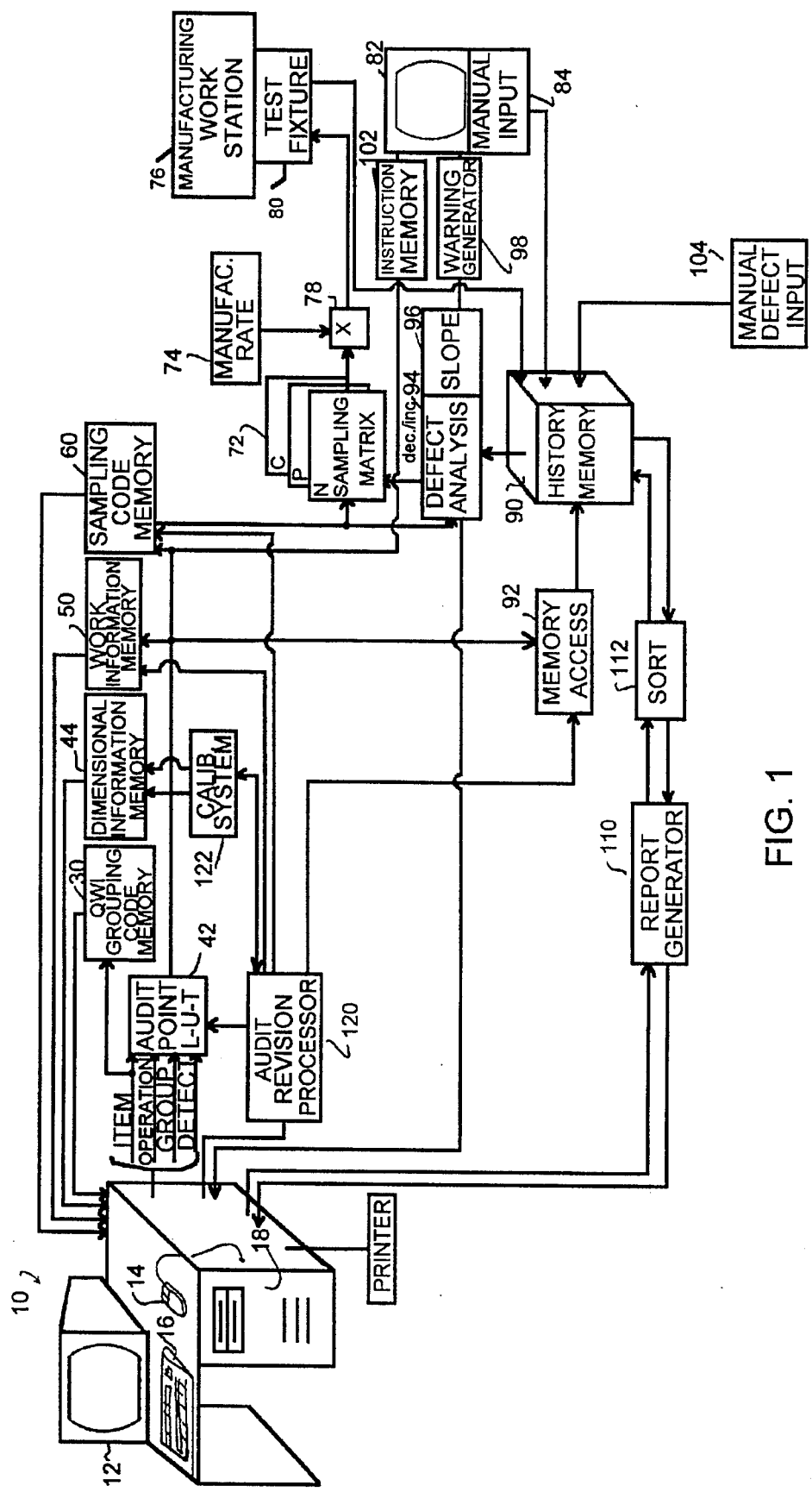
FIG. 1 is a diagrammatic illustration of a system in accordance with the present invention.
Figure 4A:
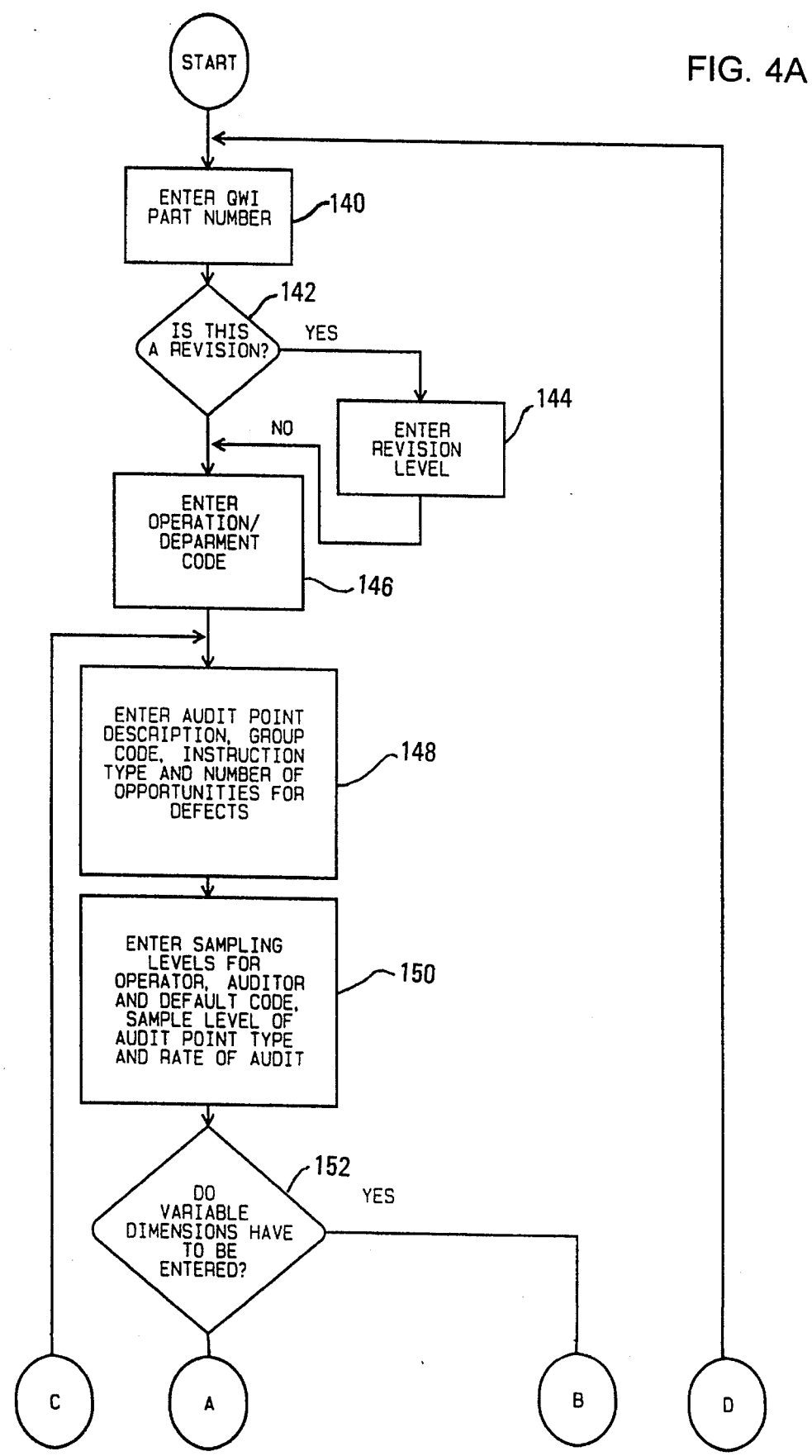
FIG. 4(A–B) illustrates details of a data history accessing and defect identification system.
Figure 4B:
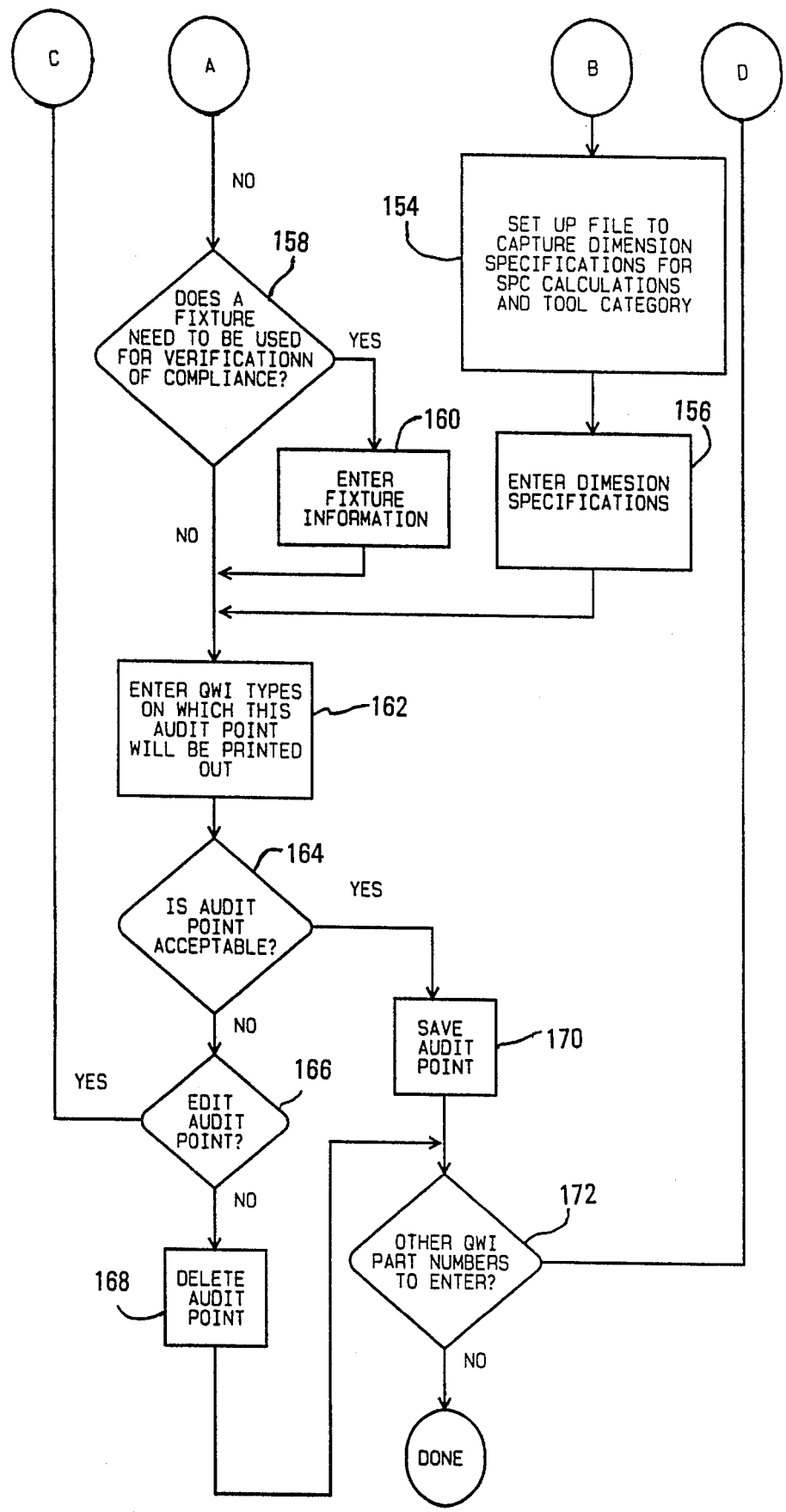

An operator interface 10 receives operator commands and provides output displays. In the preferred embodiment, the operator interface 10 is a workstation which includes a video monitor 12 that displays an input screen as illustrated in FIG.

2. An input device, such as a mouse 14 or a trackball, a keyboard 16, and an associated processor 18 with which an operator enters codes and information and perform a point and shoot selection operation.

Figure 2:
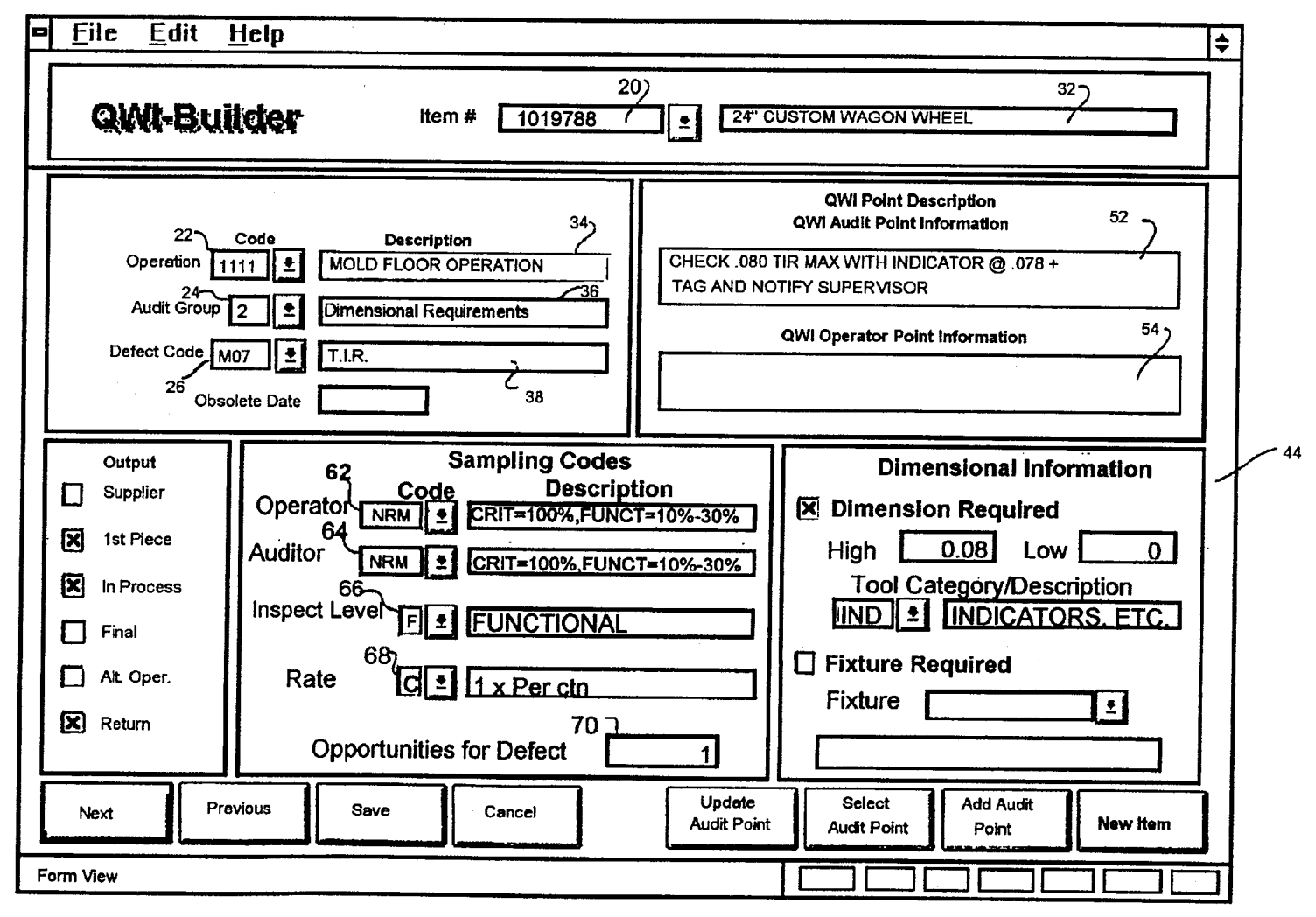

With reference to FIG. 2 and continuing reference to FIG. 1, the operator identifies an audit point or operation by using the keyboard to type in or the mouse to select an item number 20, an operation code 22, an audit group 24, and a defect code 26. These items address an item and quality work information (QWI) group code memory 30 which retrieves and displays a textual description 32 of the item, a textual description 34 corresponding to the operation code, a textual description 36 corresponding to the audit group, and a textual description 38 corresponding to the defect code. These textual descriptions are displayed on the monitor 12 to provide the operator with a verification of the entered information. Where applicable, an obsolescence date is also provided for any audit points that are no longer currently in use. The obsolete audit points are important for historical review, determining potential points of defect in new manufacturing systems, identifying potential problems in the manufacture of new parts, provide other assistance in the generation of new audit point definitions, and the like.

The item operation code, audit group code, and defect code also address an audit point look-up table or memory 42. The audit point memory 42 retrieves an identification of the audit point corresponding to the item operation audit group and defect code entered. The audit point identification addresses a dimensional information memory 44 which retrieves corresponding dimensional and test fixture information which is appropriate to the audit point. The dimensional information is conveyed to the workstation 10 and displayed 46 on the video monitor. It may identify a physical size of a part, tolerances concerning centering of a hole, results of a testing instrument or process, or the like. Further, it identifies any test fixture for performing the corresponding test, such as a laser gauging apparatus, other automatic testing equipment, manual testing equipment such as a hand-held micrometer, off-line testing equipment such as a durometer tester, or the like.

A work information memory 50 provides a written description 52 of the audit point and operator information 54. The audit point indication also addresses a sampling code memory 60. The sampling point memory stores and supplies to the monitor 12 an operator code 62, an auditor code 64, an inspection level code 66, a rate code 68, a number of opportunities for a defect to occur 70 and accompanying textual descriptions. Regarding the number of opportunities 54 for the defect to occur, for example, if five ¾" holes are drilled in five sequential operations, then five opportunities for a defect are present. On the other hand, if a more complex drilling assembly drills five ¾" holes in a single operation, then there is only a single opportunity for a defect.

The corresponding inspection level and sampling rate are also supplied by the sampling code memory 60 to a sampling matrix system 72. In the preferred embodiment, three inspection levels are provided: visual (V), functional (F), and critical (C). The critical inspection level is the highest level of inspection and tends to have the highest sampling rates; whereas, the visual inspection level tends to be the least demanding and tends to have the lowest inspection rates. The sampling matrix stores a sampling range corresponding to the audit point for each of the visual, functional, and critical inspection levels. Addressing the sampling matrix with the inspection level and a target sampling percentage or rate causes the sampling matrix to retrieve a sampling rate scale, e.g., 4–100%, and output the target sampling percentage from the scale. A second input is provided for adjusting the sampling percentage along the scale when testing results show that a higher sampling rate is needed or a lower sampling rate may be tolerated.

A manufacturing rate system 74 provides an indication of the manufacturing rate or quantity of work passing to a manufacturing workstation 76. The manufacturing rate system includes a tachometer which measures the speed of a conveyor, a counter which counts a number of units passing per minute, operator entered information such as units per carton, or the like. Alternately, the manufacturing rate or quantity, such as lot size, may be set and stored in a memory or read from associated manufacturing control software. A multiplier 78 multiplies the manufacturing rate or lot size by the sampling percentage to determine a rate fraction or number of the items to be tested. A test fixture 80, automated in a preferred embodiment, receives the sampling rate from the multiplier 78 and samples the appropriate percentage of the items. Rather than an automated test frame, the test can also be performed manually by an operator who receives sampling instructions on a monitor 82 and enters the test results on the appropriate input terminal 84. The monitor 84 displays audit instructions such as the instructions illustrated in FIG. 3 describing visual, dimensional, testing, packaging, sampling and auditing instructions. The display also includes historical information on the audits to alert the operator to abnormal auditing results. The audit instructions include numerical requirements, e.g., dimensions, as well as attributes with "yes"/"no" or "pass"/"fail" answers.

The test results are conveyed to a history memory 90. The history memory is controlled by a memory access routine 92 that is addressed with the selected audit point from the audit point look-up table 42. The memory access routine 92 enables the test information to be stored in association with the corresponding audit point along with a revision of the audit point, operator information, date information, an identification of the test fixture, and the like. A defect analysis circuit 94 compares the number of defects or defect rate with an acceptable defect rate for the selected audit point received from the sampling code memory 60. When the defect rate increases, the defect analysis circuit 94 addresses the sampling matrix 72 to shift the sampling percentage towards the 100% sampling range. Analogously, as the defect rate drops significantly below the anticipated defect rate, the sampling percentage is shifted towards a lower end of the range. A defect slope analysis circuit 96 monitors a rate of change of the defect rate. When the defect rate starts increasing, the slope circuit activates a warning circuit 98 which causes a corresponding display, on the workstation display terminal 10, the operator monitor 82, and on other display terminals such as terminals associated with manufacturing operations upstream from the test fixture. Analogous sampling matrices are provided for other test stations to perform other audits upstream and downstream along the manufacturing procedure.

The audit point look-up table 42 also addresses an instructions memory 102 which provides written instructions for performing the selected audit point to operators at appropriate inspection or test points on the floor. The operator instruction memory is connected with the monitor 82 to convert the instructions into a human-readable display. Optionally, a printer may also be provided.

Typically, numerous tests are also performed. Additional downstream test fixtures are connected with analogous matrices to sample the appropriate sampling percentages for their respective audit points. It is to be appreciated that multiple downstream test fixtures operate concurrently storing their test results in appropriate portions of the history memory 90. Based on the history, the defect analysis circuit 94 shifts the sampling percentage in the respective sampling matrices for each of the downstream test fixtures, i.e., each of the additional audit points.

In addition to automated or manual tests, other audit information is input manually through terminal 104. The input information may include variable or numerical data and attributes such as customer surveys, warranty claim information, repair information, and the like.

Various statistical reports can be generated from the history memory 90. The workstation 10 is used to address a report generator 110. The report generator uses a sort routine 112 which selectively accesses the history memory to sort and select the stored test histories. Sorting may, for example, be on the basis of item number, operation, audit group, defect code, operator, test fixture identification, date, or the like. In this manner, an operator can identify various parameters and develop failure rate analyses based on such parameters. The report generator assembles the retrieved information into standardized reports, e.g., parts per million (ppm) tables, sigma statistical analyses, and the like, as well as into customized reports.

When an operator or engineer wants to revise a work information audit point definition or add a new one, the operator terminal 10 addresses an audit revision processor 120. The audit revision processor is connected with the dimensional information memory 44, through a calibration the quality system 122, work information memory 50, the sampling code memory 60, the history memory 90 via the memory access 92, the sampling matrix 72 via the sampling code memory 60, and the like, for retrieving analogous audit points or an audit point to be revised. The operator with the keyboard and mouse then revises the audit standard assigning it a new revision code, or creates a new audit standard and provides it with a new operation code. A tool calibration system 122 stores and calculates tolerances with which various fixtures can perform manufacturing and test operations. The audit revision processor 120 supplies test requirements to the calibration system 122 and receives appropriate tool and fixture information therefrom. Alternately, the audit revision processor 120 supplies operator designated tool and fixture information to the calibration system and retrieves the corresponding tolerances and the like therefrom.

With reference to FIG. 3, the audit revision processor preferably includes a step or means 140 for entering a work instruction part number. A step or means 142 determines whether the work instruction audit point is a revision of an existing audit point or a new one. If a revision, a step or means 144 enters the next revision level. A step or means 146 enters the operation or department code. A step or means 148 enters an audit point description, a group code, a defect code, an instruction type, and number of opportunities for defects, i.e., builds the work instruction information and work instruction grouping codes information.

A step or means 150 builds the sampling code information by entering sampling levels for the operator, auditor and default codes, audit points, sample level type, and rate of audit. A step or means 152 determines whether variable dimensions are required for the audit point selected. If numerical values are to be added, a step or means 154 sets up a file to capture dimension specs for the spec calculations and tool category. A step or means enters the dimension specifications. If no numerical values are to be added, a step or means 158 determines whether a fixture needs to be used for verification of compliance. If a fixture does need to be used, a step or means 160 enters the fixture information.

A step or means 162 enters the work information type on which the entered audit point will be printed out. A step or means 164 determines whether the audit point meets all necessary criteria and is acceptable. If the audit point is not acceptable, a step or means 166 inquires whether the audit point is to be edited further. If yes, the processor returns to step or means 148. If no further editing is to be provided to the unacceptable audit point, a step or means 168 deletes the entered audit point information. On the other hand, when the audit point is determined to be acceptable, a step or means 170 saves the audit point. A step or means 172 queries whether other work information part numbers are to be entered. If not, the program concludes. If additional work information part numbers are to be added, the processor returns to step or means 140.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A self-correcting work inventory instruction system comprising:

a sampling matrix memory which stores a sampling range of sampling percentages for each of a plurality of operator selectable audits, the sampling matrix being responsive to operator selected audit information to select a corresponding sampling range and an initial output percentage from within the sampling range, the sampling matrix memory further being addressable to increment and decrement the output sampling percentage in the range;

a defect information feedback means for providing test result information;

a defect analysis means for comparing the test result information from the defect information feedback means with preselected defect information for the selected audit, the defect analysis means being connected with the sampling matrix memory for incrementing and decrementing the output sampling percentage within the sampling range in accordance with deviations between the test result information and the preselected defect information.

2. The system as set forth in claim 1 further including a history memory connected with the defect feedback means for storing the test result information in association with an identification of the selected audit.

3. The system as set forth in claim 2 wherein the defect feedback means includes an automated test fixture which automatically tests manufactured items and provides the test result information.

4. The system as set forth in claim 2 wherein the defect feedback means includes a manual input terminal for receiving operator input information regarding product defects and failures.

5. The system as set forth in claim 4 further including:

a sorting means for accessing and retrieving information in the history memory and sorting the retrieved information related to a test result, product defect, and failure information in accordance with sorting parameters input at an operator input terminal.

6. The system as set forth in claim 2 further including a multiplier which multiplies the output sampling percentage from the sampling matrix memory by a manufacturing rate to produce a sampling rate.

7. The system as set forth in claim 6 further comprising an operator input terminal including:

a video display, a computer which provides display information to the video display, and at least a mouse, the computer providing a picture on the video display which includes blanks for receiving at least item identification and defect codes and providing icons for selecting and indexing at least item identification and defect codes with the mouse, whereby a point and shoot audit selection is provided.

8. The system as set forth in claim 7 further including memories for providing display information to the video display displaying parameters of the selected audit.

9. The system as set forth in claim 2 further including an operator input terminal and an audit look-up table, the audit look-up table being connected with the operator input terminal to receive an identification of at least an item to be manufactured and a defect identification code, the audit look-up table retrieving an identification of the selected audit corresponding to the identified item and defect code.

10. The system as set forth in claim 9 wherein the audit look-up table further receives an operation code and audit group identification from the operator input terminal.

11. The system as set forth in claim 2 further including an audit revision processor connected with an operator input terminal, the audit revision processor being controlled by the operator input terminal to create additional selectable audits and identifying the corresponding audit parameters.

12. The system as set forth in claim 11 wherein the audit revision processor includes:

a means for entering work information and part number identifications received from the operator input terminal;

a means for entering audit descriptions and audit characteristics received from the operator input terminal;

a means for entering sampling levels for sampling items audited pursuant to each selected audit; and, a means for entering information on fixtures used to perform audits.

13. A self-correcting work inventory method comprising:

for each of a plurality of audits, storing a corresponding range of sampling percentages in a computer memory;

with a workstation, modifying the audits and adding additional audits including adding and changing test criteria and defect standards and storing the test criteria and defect standards in the computer memory; reading a sampling percentage from the computer memory and testing the indicated percentage of products;

testing items in accordance with the test criteria of a selected one of the audits stored in the computer memory and providing test results indicative of at least defect information;

storing the defect information as a defect history in the computer memory;

comparing the defect information with the defect standards for the selected audit;

in response to the defect information differing from the audit defect standards, incrementing or decrementing the sampling percentage retrieved from the computer memory.

14. The method as set forth in claim 13 further including with an operator input terminal, inputting information regarding product defects and failures into the defect history stored in the computer memory.

15. The method as set forth in claim 13 further including displaying the sampling percentage and other audit characteristics on a monitor which is visible to a human tester, and wherein the defect information is manually entered on an input terminal.

16. The method as set forth in claim 13 wherein each audit is defined by at least an identification of an item to be manufactured and a defect identification and further including:

at the workstation, entering the item identification and the defect identification;

using the item and defect identifications to address a look-up table and outputting from the look-up table an identification of the selected audit.

17. The method as set forth in claim 16 further including:

converting the audit identification output by the look-up table into a human-readable display of audit characteristics for display on the workstation.

18. The method as set forth in claim 17 wherein the workstation includes a video display having designated spaces for displaying the audit characteristics, the item and defect identifications, and icons and further including:

with an input device, moving a cursor to select icons on the video display and activating the input device to select other item and defect identifications to select different audits.

19. The method as set forth in claim 13 further including accessing the computer memory and sorting defect information to develop tables and reports.

* * * * *